Oct. 30, 1951   J. C. CHILDS   2,573,543
COMBINED STEREOSCOPIC CAMERA AND VIEWER
Filed Aug. 30, 1949

INVENTOR.
JOHN C. CHILDS
BY
ATTORNEY

Patented Oct. 30, 1951

2,573,543

UNITED STATES PATENT OFFICE 2,573,543

COMBINED STEREOSCOPIC CAMERA AND VIEWER

John C. Childs, New Rochelle, N. Y.

Application August 30, 1949, Serial No. 113,145

7 Claims. (Cl. 88—31)

The present invention is directed to a stereoscopic viewing device, more particularly to one which may be used both as a viewer and as a camera.

Stereoscopic viewers have been on the market for a considerable time and they generally consist of a casing having two passageways with lenses on one end thereof and ground glass plates at the other end with provision for passing a film in the passageways in front of the ground glass. It has also been common to provide cameras having pairs of lenses so arranged that stereoscopic photographs may be taken. In one instance, it was proposed to use the stereoscopic viewer as a camera but such constructions were not successful for various reasons.

The present invention is intended and adapted to overcome the disadvantages inherent in prior structures of the type described, it being among the objects of the present invention to provide a combination of stereoscopic camera and viewer, which may be readily transformed from one device to the other.

It is also among the objects of the present invention to provide a device of the type described, wherein a stereoscopic viewer is adapted to be introduced into a suitable casing containing necessary elements whereby it may be used as a camera.

It is further among the objects of the present invention to provide a combination of stereoscopic camera and viewer, which is simple in construction, easy to operate, which is sturdy and is capable of being handled without damage thereto.

In practicing the present invention, there is provided the usual stereoscopic viewer, consisting of the usual elements, with means at the back for feeding film laterally through the same. In order to transform the viewer into a camera, there is further provided a casing into which the viewer is fitted.

The casing consists of a rectangular member having a pair of openings in the front, while adapted to register with the lenses of the viewer when it is in position. In the front wall, a suitable shutter is arranged with means for changing the opening, speed of operation and the like, as is usual. The rear of the casing is open and a cover member fits over the same to complete the arrangement. Means are provided at the rear of the casing for holding a spool of film at one side thereof, for threading the film through the device, and additional means are provided on the cover at the opposite side of the device for receiving the film as it is unrolled and fed through the device.

The viewer is usually provided with a mechanism including a reciprocating handle retracted by a spring whereby when the handle is shifted, it feeds the film a predetermined distance and when the handle is released, it assumes a position for the next feeding of film. The rear of said casing is provided with means to allow the handle to project therefrom so that when the device operates as a camera, feeding of film is accomplished by the same means as used for viewing the film. Within the casing clips or suitable other devices are provided to frictionally hold the viewer against accidental displacement. Within the viewer there is provided a partition so as to prevent light from one passage entering the other when exposing film.

In the accompanying drawing constituting a part hereof, and in which like reference characters indicate like parts, Fig. 1 is a perspective view of the combined stereoscopic camera and viewer with the cover of the casing in position, and an indication of how the cover is removed;

Figure 1:
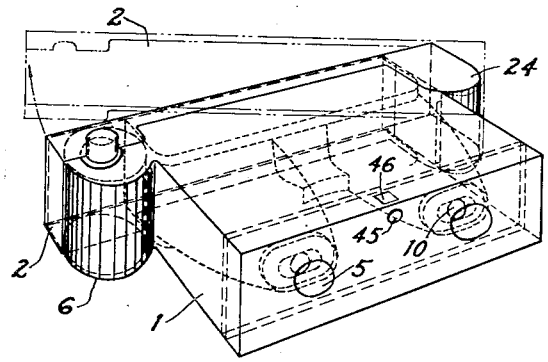

The device consists essentially of a rectangular casing 1, open at the rear, and having a cover 2 fitted thereon. A stereoscopic viewer 3 is held within said casing.

The front 4 of the casing is rectangular in cross-section and has in the front wall thereof a pair of openings 5 suitably spaced to give stereoscopic vision. An enlargement 6 constituting a film holding chamber, is provided with a notch 7 at the ends thereof providing means for inserting a spool of film therein.

The viewer consists of two members 8 and 9, which are hollow and constitute passages. Lenses 10 are inserted in the front end of said passages in alinement with openings 5. The rear 11 thereof is open. A plate 12 constituting a film cover plate having rectangular openings 13 therein and made of relatively thin material has a pair of partitions 14 integral therewith and extending forwardly. Openings 13 are adapted to confine light to the areas of single frames of the film. Member 12 is inserted into rear 11 of the viewer so that partitions 14 enter bridge 15 and light-proof passages 8 and 9.

Figure 2:
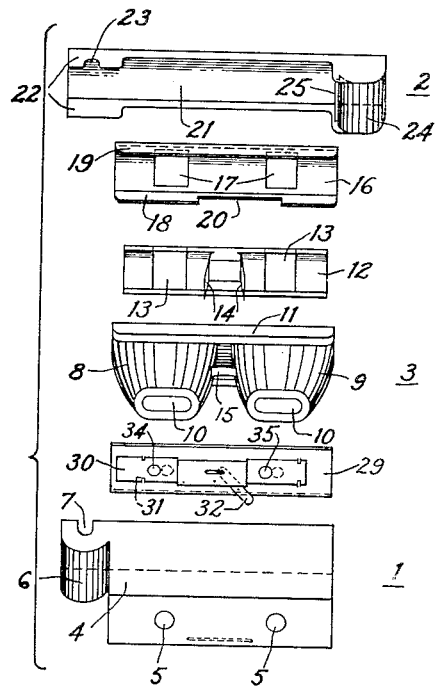
Fig. 2 is an exploded view taken in perspective from the front of the device and showing each of the elements in their relative positions ready for assembly.
Figure 3:
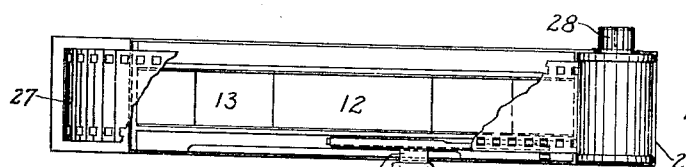
Fig. 3 is a front view showing the film in position, some parts being broken away for clearness, and with the camera and viewer covers removed.

A cover 16 has rectangular openings 17 alined with openings 13 and having ground glass plates fitted therein. It is provided with lower and upper flanges 18 and 19 with a recess 20 in the lower flange for accommodating the extended handle described below. The casing cover has a rear face 21 and upper and lower flanges 22 with a notch 23 at the left as shown in Fig. 2. An extension 24 at the right hand end, as shown in Fig. 2, forms a chamber for the reception of film and has an extending edge 25 thereon. A corresponding slot 26 in the side of casing 1 is provided for entrance of edge 25 to hold cover 2 in position on casing 1. Within chamber 24 is a cylindrical spring member 26' into which film 27, fed from a spool at the right of casing 1, is adapted to be coiled. Film re-winder 28 fits on chamber 24.

Figure 5:
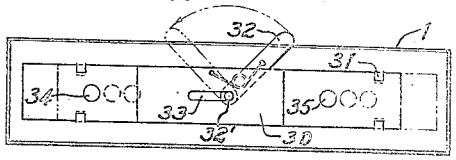
Fig. 5 is a vertical cross-sectional view taken along the line 5—5 of Fig. 4.

A shutter is arranged within casing 1 adjacent to openings 5 and consists of a plate 29 having a slide 30 held thereon by clips 31. A spring loaded actuating member 32, as more particularly shown in Fig. 5, is adapted to pivot on screw 32'. Slot 33 permits slide 30 to move past screw 32'. Adjusting means for the exposure time may be provided, as usual. Openings 34 and 35 in slide 30 are adapted to be placed in and out of register with openings 5 by operation of actuator 32.

In order to securely hold viewer 3 within casing 1, there are provided two sets of clips 36 and 37 extending rearwardly from the inner front wall of the casing and adapted to grip passages 8 and 9, respectively.

The means within the viewer for feeding film consists of a contactor 38 adapted to frictionally engage a notch of the film, secured by a resilient strip 39 to member 40, which in turn has connected thereto a coil spring 41 mounted within the viewer. A handle 42 extends through a slot at the bottom of viewer 3 and has an operating knob 43 on the end thereof. Said handle 42 is adapted to operate across recess 20 of viewer cover 16.

When the device is operated as a stereoscopic viewer, an assembly is provided of viewer 3 with or without member 12 and viewer cover 16. Film is fed into one end of the viewer through slit 27' and by manipulation of knob 43 is caused to progressively pass through the viewer and out at the opposite end through slit 27'. When the device is to be used as a camera, the viewer assembly is introduced into casing 1 and is gripped by clips 36 and 37.

Figure 4:
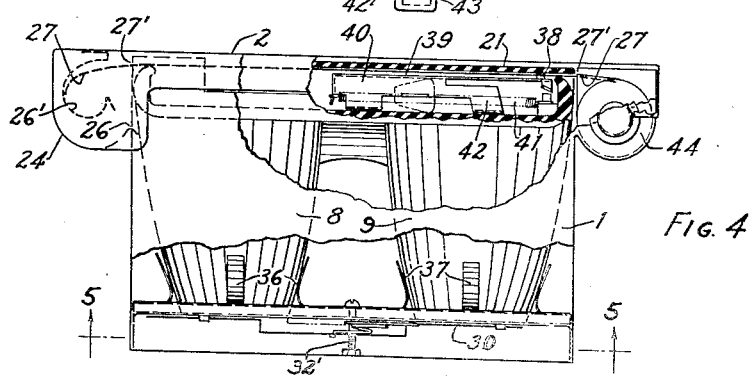
Fig. 4 is a top plan view of the assembled structure, some parts being broken away for clearness.

A spool or roll of film 44 is inserted in the chamber formed by projection 6 of casing 1 and film 27 is fed into slot 27' and through the device until it extends out of the opposite slot 27' at the left of Fig. 4. The end of the film is introduced into cylindrical spring 26' and cover 2 is placed in position with edge 25 inserted in slit 26. The device is now in position to be operated as a camera. In connection therewith, there is provided the usual focusing device, consisting of a lens 45 and ground glass 46, with suitable adjuncts as is well-known.

Although the invention has been described setting forth a single specific embodiment thereof, the invention is susceptible to a number of changes in the details without departing from the principles herein set forth. For instance, projection 6 may be formed on cover 2 and chamber 24 may be formed on casing 1. Other means for holding and feeding the film than shown in the drawing may be substituted therefor. The viewer may be of different specific construction and may be held in the casing by other means. The form of the casing may be changed to accommodate the form of viewer 3. Other elements may be added to the structure and suitable materials may be used for the several parts, including metals, molded plastics and the like.

These and other changes in the details of construction may be made within the spirit of the invention, which is to be broadly construed and not to be limited except by the character of the claims appended hereto.

I claim:

1. A combined stereoscopic camera and viewer comprising a casing open at the rear, a pair of spaced openings in the front wall thereof, a shutter in said front wall adapted to operate over said openings, a stereoscopic viewer unit having a pair of passages with lenses at the front of said passages in alinement with said openings, said viewer having a back provided with translucent surfaces and slots at the ends thereof for the passage of film in front of said surfaces, an opaque film cover plate adjacent to said surfaces and having openings in register with said translucent surfaces, mechanism in said viewer advancing said film having a handle extending therefrom, means for holding said viewer within said casing, a cover for the rear of said casing having enlarged ends for receiving film spools, film holding chambers at the junction of said casing and casing cover, means in one of said chambers for feeding film, and means for securing said cover onto said casing, said viewer as a unit being removable from said casing.

2. A combined stereoscopic camera and viewer comprising a casing open at the rear, a pair of spaced openings in the front wall thereof, a shutter in said front wall adapted to operate over said openings, a stereoscopic viewer unit having a pair of passages with lenses at the front of said passages in alinement with said openings, said viewer having a back provided with translucent surfaces and slots at the ends thereof for the passage of film in front of said surfaces, an opaque film cover plate adjacent to said surfaces and having openings in register with said translucent surfaces, mechanism in said viewer advancing said film having a handle extending therefrom, a light-proof partition between said passages, means for holding said viewer within said casing, a cover for the rear of said casing having enlarged ends for receiving film spools, film holding chambers at the junction of said casing and casing cover, means in one of said chambers for feeding film, and means for securing said cover onto said casing, said viewer as a unit being removable from said casing.

3. A combined stereoscopic camera and viewer comprising a casing open at the rear, a pair of spaced openings in the front wall thereof, a shutter in said front wall adapted to operate over said openings, a stereoscopic viewer unit having a pair of passages with lenses at the front of said passages in alinement with said openings, said viewer having a back provided with translucent surfaces and slots at the ends thereof for the passage of film in front of said surfaces, an opaque film cover plate adjacent to said surfaces and having openings in register with said translucent surfaces, mechanism in said viewer advancing said film having a handle extending therefrom, means for holding said viewer within said casing, a cover for the rear of said casing having enlarged ends for receiving film spools, film holding chambers at the junction of said casing and casing cover, means in one of said chambers for feeding film, said handle extending out of said casing, and means for securing said cover onto said casing, said viewer as a unit being removable from said casing.

4. A combined stereoscopic camera and viewer comprising a casing open at the rear, a pair of spaced openings in the front wall thereof, a shutter in said front wall adapted to operate over said openings, a stereoscopic viewer unit having a pair of passages with lenses at the front of said passages in alinement with said openings, said viewer having a back provided with translucent surfaces and slots at the ends thereof for the passage of film in front of said surfaces, an opaque film cover plate adjacent to said surfaces and having openings in register with said translucent surfaces, mechanism in said viewer advancing said film having a handle extending therefrom, means for holding said viewer within said casing, a cover for the rear of said casing having enlarged ends for receiving film spools, film holding chambers at the junction of said casing and casing cover, means in one of said chambers for feeding film, said handle extending out of said casing at the junction thereof with said cover, and means for securing said cover onto said casing, said viewer as a unit being removable from said casing.

5. A combined stereoscopic camera and viewer comprising a casing open at the rear, a pair of spaced openings in the front wall thereof, a shutter in said front wall adapted to operate over said openings, a stereoscopic viewer unit having a pair of passages with lenses at the front of said passages in alinement with said openings, said viewer having a back provided with translucent surfaces and slots at the ends thereof for the passage of film in front of said surfaces, an opaque film cover plate adjacent to said surfaces and having openings in register with said translucent surfaces, mechanism in said viewer advancing said film having a handle extending therefrom, means for holding said viewer within said casing including clips secured to the inside of said casing and embracing at least one of said passages, a cover for the rear of said casing having enlarged ends for receiving film spools, film holding chambers at the junction of said casing and casing cover, means in one of said chambers for feeding film, and means for securing said cover onto said casing, said viewer as a unit being removable from said casing.

6. A combined stereoscopic camera and viewer comprising a casing open at the rear, a pair of spaced openings in the front wall thereof, a shutter in said front wall adapted to operate over said openings, a stereoscopic viewer unit having a pair of passages with lenses at the front of said passages in alinement with said openings, said viewer having a back provided with translucent surfaces and slots at the ends thereof for the passage of film in front of said surfaces, an opaque film cover plate adjacent to said surfaces and having openings in register with said translucent surfaces, mechanism in said viewer advancing said film having a handle extending therefrom, means for holding said viewer within said casing including clips secured to the inside of said casing and embracing the front ends of both of said passages, a cover for the rear of said casing having enlarged ends for receiving film spools, film holding chambers at the junction of said casing and casing cover, means in one of said chambers for feeding film, and means for securing said cover onto said casing, said viewer as a unit being removable from said casing.

7. A combined stereoscopic camera and viewer according to claim 1, in which one of said film holding chambers is on one end of said casing cover and the other chamber is on the opposite end of said casing from said first chamber.

JOHN C. CHILDS.

REFERENCES CITED

The following references are of record in the file of this patent:

UNITED STATES PATENTS

| Number | Name | Date |
|---|---|---|
| 728,977 | Rancoule | May 26, 1903 |
| 1,957,043 | Harlow | May 1, 1934 |
| 2,006,914 | Fayolle | July 2, 1935 |
| 2,207,483 | Hennicke et al. | July 9, 1940 |
| 2,326,718 | Mast | Aug. 10, 1943 |
| 2,361,661 | Sparling | Oct. 31, 1944 |